United States Patent [19]

Beezer

[11] 4,166,527
[45] Sep. 4, 1979

[54] DEVICE FOR PICKING UP AND PLACING ARTICLES ON MOVABLE CONVEYORS AND ASSEMBLY LINES AND TO AN ENDLESS CONSTRUCTION AND TO AN ARTICLE PICKUP AND DEPOSIT DEVICE THEREFOR

[75] Inventor: Earl F. Beezer, Hillsdale, N.J.

[73] Assignee: Stelron Cam Company, N.J.

[21] Appl. No.: 820,833

[22] Filed: Aug. 1, 1977

[51] Int. Cl.$^2$ ............................................. B65G 37/00
[52] U.S. Cl. ..................................... 198/486; 74/24; 198/575; 414/739
[58] Field of Search ............... 198/341, 486, 575, 576, 198/488, 631; 214/1 BB; 74/24; 29/783, 786, 791, 793, 822

[56] References Cited

U.S. PATENT DOCUMENTS

| | | | |
|---|---|---|---|
| 2,737,285 | 3/1956 | Cookson et al. | 198/576 |
| 3,244,080 | 4/1966 | Dueringer et al. | 198/486 |
| 3,703,834 | 11/1972 | Beezer | 214/1 BB |
| 3,799,317 | 3/1974 | Shibata et al. | 198/486 |
| 3,869,924 | 3/1975 | Beezer | 74/24 |
| 3,881,362 | 3/1975 | Beezer | 214/1 BB |
| 3,958,682 | 5/1976 | Martin | 214/1 BB |
| 4,036,374 | 7/1977 | Woltjen | 198/486 |

*Primary Examiner*—Robert B. Reeves
*Assistant Examiner*—Douglas D. Watts
*Attorney, Agent, or Firm*—McGlew and Tuttle

[57] ABSTRACT

A device for picking up and placing articles on a moving conveyor or assembly line, comprising a conveyor including a support adapted to be moved in a first conveyor shaft, an article station adjacent the conveyor, an article handling device support assembly adjacent the conveyor, an arrangement mounting the article handling device support assembly for movement along an article handling path, and a reciprocating drive connected to the conveyor and to the article handling support assembly to move the article handling support assembly in timed relationship to the conveyor. The article handling device support assembly includes an article pickup member having an article gripping head, the drive means including a drive connection to the article pickup member to move the pickup member and to lift and lower it for picking up and depositing articles and moving them through an article movement path intercepting the conveyor support and the article station the drive moving the article handling support assembly in timed relationship to the movement of the conveyor whereby articles may be placed on the support and the articles are moved at selected speeds in respect to the conveyor.

8 Claims, 9 Drawing Figures

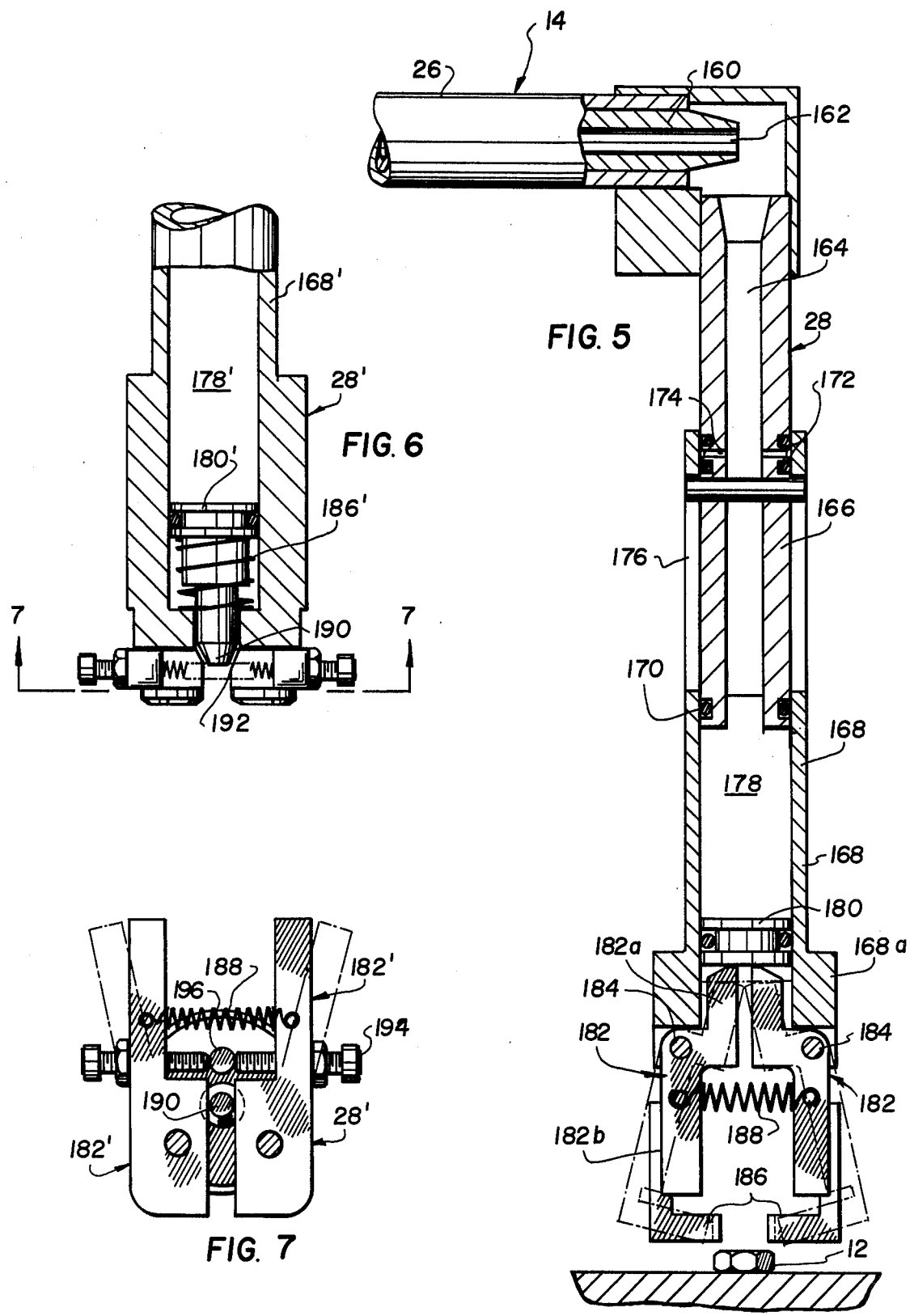

DEVICE FOR PICKING UP AND PLACING ARTICLES ON MOVABLE CONVEYORS AND ASSEMBLY LINES AND TO AN ENDLESS CONSTRUCTION AND TO AN ARTICLE PICKUP AND DEPOSIT DEVICE THEREFOR

BACKGROUND OF THE INVENTION

1. Field of the Invention

This invention relates in general to the construction of devices for feeding individual articles or machine parts or the like to moving conveyors or assembly lines or delivery lines and in particular to a new and useful device which includes a movable conveyor located alongside of an article station with a transmitter support assembly mounted adjacent the conveyor for movement along a transmitted path substantially parallel to the conveyor and in timed relationship to the conveyor and wherein the transmitter includes a transmitter boom for picking up an article and moving it to the conveyor from the article station or vice versa and wherein the drive means for the conveyor is connected to the drive means for the transmitter and for the transmitter support so that they may all be operated in precise timed relationship.

2. Description of the Prior Art

Prior to the present invention it was usual to provide devices which are capable of moving articles from fixed locations onto a station or support which is moving but such devices operated to deposit such articles in a continuous time stream before the conveyors were temporarily stopped or indexed during a time at which each article is placed in position. The known machines suffer from a basic disadvantage in that the articles cannot be precisely picked up at any rate of speed selected and moved so that they are brought up to a speed commensurate with a moving conveyor and precisely positioned with respect to any spot on the conveyor which may require the article. This means that any operational heads, or other operating parts on the moving conveyor, had to be precisely oriented so as to not interfere with one of the operating parts of the device for picking up the stationary articles and placing them on the conveyor.

SUMMARY OF THE INVENTION

In accordance with the present invention there is provided new and useful conveyor system or device for picking up and placing articles on a moving conveyor assembly line or similar machine operation wherein the conveyor is run at a timed speed and the drive for the conveyor is connected to a drive for moving a transmitter support assembly. The transmitter support assembly is mounted on a support plate or slide and it is advanced in a selected direction in respect to the conveyor means and at precisely the speed of the conveyor if so desired and during this time it is also operated by a drive which is also timed from the conveyor drive to precisely move a pickup device for example in the form of a pivotal boom which moves upwardly and downwardly for engaging and disengaging articles. With the inventive construction the transmitter support assembly may be moved alongside the conveyor during the time at which it is operated to pick up an article from a fixed article station and to move it on to the conveyor or vice versa. The construction is such that the support for the transmitter may be moved in the precise timed relationship of the conveyor and in addition a further timing may be effected in the transmitter itself so the pickup and movement of the article will be at all times timed with the speed of the location of the pickup or placement of the article so that precise operations may be carried out.

In accordance with a feature of the invention the conveyor itself is designed for the precision assembling or the de-assembling of the parts or for the accurate placing of parts in respect to machine operation. For this purpose the conveyor is made up of interconnected links with the link elements including a block member which has one or preferably two longitudinally extending bores therein which are provided with linear roller bushings to facilitate the engagement of the blocked members on cylindrical rod members which glide in the linear ball bearings and provide for a smooth steady movement of the conveyor block elements. The block elements define a top surface with a support or clamping formation for example for placing articles which are to be for example threaded together or assembled one over the other, etc. A feature of the construction is that each block member includes a link extending outwardly from each end which comprises two link members interconnected by a pivot link which provides the pivotal connection between adjacent links. The block members themselves carry roller supports and the whole conveyor is advantageously constructed so that these roller supports may ride in the lower reach of the conveyor on guide members so that they are supported against sagging or displacement. On the upper reach, the block members guided on the rod members which engage through the linear ball bearings which are carried in the bores of the block members.

The arrangement also advantageously includes a fluid pressure operated device for picking up and placing articles, which forms a part of the transmitter assembly. In the preferred form the device includes a sleeve member which is mounted for movement on a tubular member which is connected to a source of pressure. The pressure in the space between a piston carried within the sleeve member and the tubular member causes an elongation of the sleeve member in relationship to the tubular member and the actuation of grippers to either close or open to engage an article. The construction is such that if an article strikes a nonresistant surface then the operation of the sleeve member will collapse in respect to the tubular member so as to vent the tubular member and relieve the operating pressure so as to minimize any damage which may occur during the pickup of the articles.

A particular advantageous arrangement of the invention is to provide for the table mounting of the endless conveyor so that the upper reach projects through the table and is substantially level with the table top and it is mounted so that the sprockets arranged between the guide rod and the lower guide rails for the block members may be adjusted longitudinally to change the spacing of the sprockets to make sure that tension of the length of the conveyor is maintained uniform. The construction makes it possible to mount a reciprocator on a platform between the top of the table and the bottom which effects a back and forward movement of support assemblies which carry one or more transmitters or translators which are adapted to pick up and position articles. The construction is such that a reciprocator may easily move the supports in timed relationship to the conveyor and the drive may be easily connected to the individual driving cams of the transmitter by using a gear belt from a common drive for all of these parts. The gear belts make it possible to provide a positive action driving from one drive shaft to a driven shaft for example of the main drive to a transmitter even though the transmitter itself moves longitudinally since the belt may absorb a reasonable amount of longitudinal movement without any change in timing or without unduly stressing the belt.

Accordingly it is an object of the invention to provide an improved device for use with a moving conveyor for placing and removing articles therefrom which comprises an article transmitter support and includes a reciprocator device having a rotatable shaft adapted to be connected to the conveyor for rotation in timed relationship thereto and at least one rod member in the reciprocated device which is movable backwardly and forwardly in longitudinal direction which is movable by cam means in the reciprocator so as to move the reciprocating device in timed relationship to the conveyor and wherein the transmitter support is adapted to contain a transmitter having means for picking up and depositing articles in timed relationship to the conveyor.

A further object of the invention is to provide a device for picking up and placing articles on a moving conveyor or assembly line which comprises conveyor means including a support adapted to be moved in a conveyor path, an article station adjacent the conveyor, a transmitter support assembly adjacent the conveyor and means mounting the support for movement along a transmitter path and wherein drive means are provided which are connected to the transmitter support assembly and to the conveyor to move the transmitter support assembly in timed relationship to the conveyor and wherein the transmitter support assembly includes a transmitter boom having an article pickup member with article gripping means and wherein the drive means include a drive connection to the boom to pivot the boom with the pickup member and to lift the load and lower the boom for picking up and depositing articles through a path intercepting the conveyor means and the article support station so that the article is not only picked up and placed in timed relationship to the movement of the conveyor but it is carried by a transmitter member which is moved in timed relationship to the conveyor.

A further object of the invention is to provide an improved endless conveyor particularly for precision assembly and de-assembly of parts which comprises a plurality of pivotally interconnected links with at least one of them comprising a block member having at least one longitudinally extending bore defined therethrough with linear ball bearing means therein and which further includes a fixed longitudinally extending cylindrical guide rail adapted to be engaged in the ball bearings of the block member and which further includes a guide member disposed below and substantially parallel to the guide rail and first and second sprocket wheels rotatably mounted on respective axes between the guide rail and the guide member beyond the respective ends thereof and wherein there are roller means on the block member engageable on the guide member during the lower hozizontal movement of the block member.

A further object of the invention is to provide a fluid pressure operated device for picking up and depositing articles at various article stations and on conveyor supports which includes a sleeve member which is reciprocable in respect to a tubular member which is connectable to a pressure source and wherein a piston is movable in a sleeve member to engage two movable mounted gripper members on the sleeve member to selectively move them so that they are shifted apart to drop the article or together to pick up the article and wherein the sleeve member includes a slot portion which aligns with a vent opening of the tubular pressure member to relieve the pressure of operation behind the piston and to avoid damaging of the parts when there is a resistance to the placement movement of the sleeve part.

A further object of the invention is to provide a device for picking up and placing articles into a conveyor used in association therewith and also to a pickup and placement device therefor which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWINGS

In the Drawings:

FIG. 5 is an enlarged partial elevational and partial transverse sectional view of a pickup head construction for the device shown in FIG. 1;

FIG. 6 is a view similar to FIG. 5 of another embodiment of the invention;

FIG. 7 is a section taken along the line 7—7 of FIG. 6;

GENERAL DESCRIPTION OF THE PREFERRED EMBODIMENTS

Figure 1:
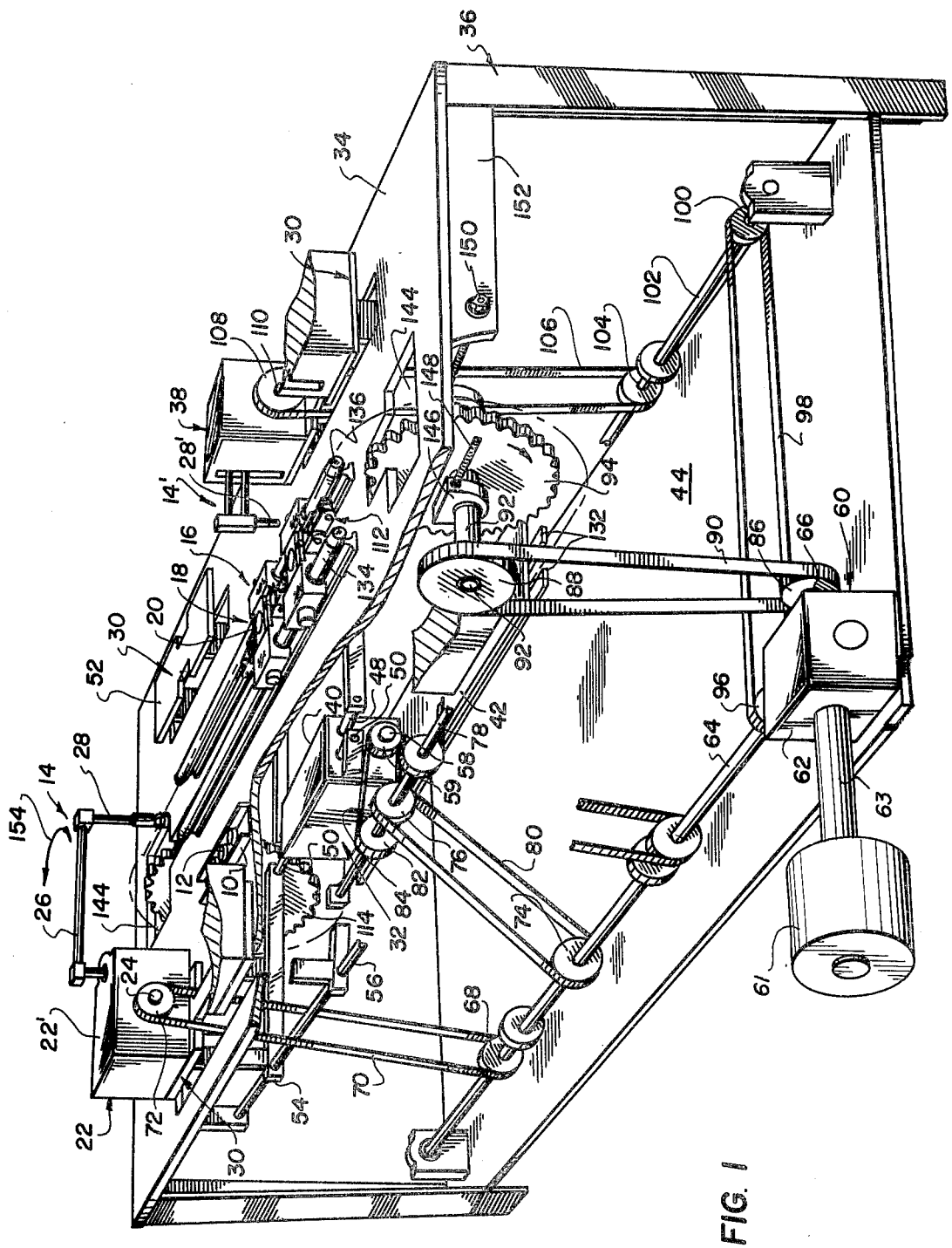
FIG. 1 is a front, top perspective partly in section of a device for feeding four separate sets of articles to a moving conveyor constructed in accordance with the invention.

Referring to the drawings in particular, the invention embodied therein in FIG. 1 comprises a device for automatically picking up articles from a station such as a station 10 having articles 12 by means of an article handling device generally designated 14, moving the article at a speed of a conveyor generally designated 16 and placing the article on a support generally designated 18 where for example the article may be assembled or juxtaposed with another part which is precisely positioned in a receiving recess 20. Alternatively, the article 20 may be picked up by the handling device 14 after it is first moved in synchrony with the conveyor 16 and returned to an article station 10 or even to a movable article conveyor.

Figure 9:
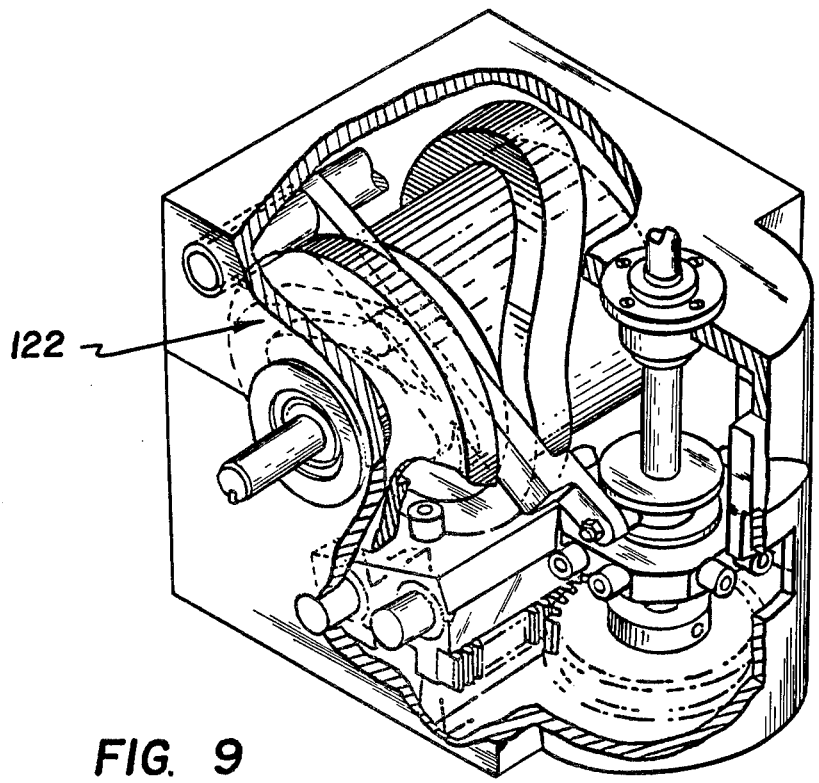
FIG. 9 is a schematic view of the cam mechanism on the translator.

In accordance with a feature of the invention the article handling device 14 is incorporated in an apparatus referred to as a translator or tramsmitter generally designated 22 which is of a type which is described for example in U.S. Pat. No. 3,869,924 and/or U.S. Pat. No. 3,881,362. Such a device 22 includes a rotating cam comprising pick-up member control cam means 122 shown in FIG. 9 inside of a housing 22' which is driven by a drive shaft 24 to move the article handling device 14 through a defined swinging path and upward and downward path for the picking up or depositing of article 12 at either a station 10 or on the conveyor support 18. In the embodiment shown the article handling device 14 includes a boom 26 which has a pickup head 28 at the end thereof and the boom 26 is raised and lowered and pivoted in timed relationship to the operation of the conveyor 16.

In accordance with the invention the device 22 is mounted on a support assembly or support member generally designated 30 which is reciprocated under the control of a reciprocator device generally designated 32 so that the device 22 is moved in timed relationship to the conveyor speed 16 during a time at which it is moved after picking up an article 12 which is to be placed on the conveyor 16 or during a time at which it picks up an article from the conveyor and begins to move it off the conveyor.

In the embodiments shown the apparatus includes four separate support assemblies with only three being indicated but which are symmetrically positioned over a table top 34 of a machine frame or foundation 36 and two of such support assemblies are shown on each side of the conveyor 16. Each support assembly 30 is adapted to contain one or more devices such as the device 22 or a device generally designated 38 which is a type of a device for picking up and placing machine parts, etc. of a type shown in U.S. Pat. No. 3,881,362 and which includes a modified type of pick-up member control means 122.

Figure 8:
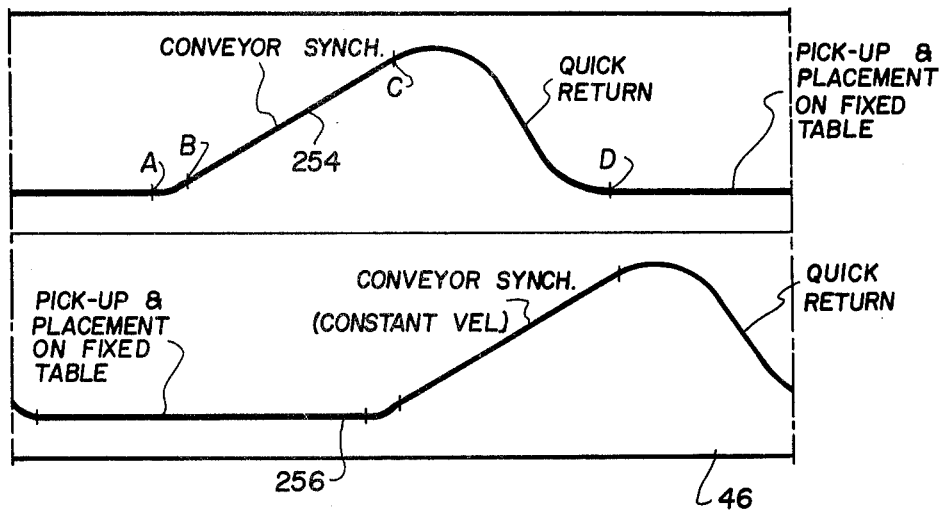
FIG. 8 is a development view of a cam for use in the reciprocator with the invention.

In accordance with a feature of the invention the reciprocator 32 which for example may be of a type indicated in U.S. Pat. No. 3,703,834, includes a housing 40 which is mounted on a small platform 42 above a base platform 44 of the machine frame 36 directly adjacent the conveyor 16 and it includes a cam 46 comprising article support control cam means the profile of which is indicated in FIG. 8 which provides a control for the reciprocating movement of each of two shafts 48 and 50 which are connected to the respective slide assemblies 30 to move them in synchrony with the conveyor 16.

The slide assemblies 30 include a support base or platform 52 which are carried by slides 54 which are guided on rods 56 for longitudinal displacement backwardly and forwardly with respect to the direction of advance of the conveyor 16.

The control cam 46 is rotated by an input shaft 58 having a gear pulley 59 thereon. In accordance with a still further feature of the invention single drive means generally designated 60 is provided for driving all of the operating parts including the conveyor 16. In the embodiment shown the drive means 60 includes a motor 61 which has a shaft 63 which drives through a transmission 62 which has an output shaft 64 and an output shaft 66 which are at right angles to each other. The shaft 64 drives the device 22 through a drive gear pulley and an accurately timed gear belt 70 to a gear pulley 72 affixed to the device 22. Similarly a drive gear pulley 74 on the shaft 64 drives a pulley 76 on a shaft 78 through a timing gear belt 80. Shaft 78 contains a gear pulley 82 which drives the gear 59 through a gear belt 84.

In accordance with a feature of the invention the shaft 66 contains a gear pulley 86 which drives a gear pulley 88 through a gear belt 90 to rotate a sprocket shaft 92 with a sprocket wheel 94 of a multiconveyor 16 in timed relationship with both the reciprocator device 32 and to the article handling devices 22 and 38.

The drive for the opposite side devices is effected through a gear pulley 96 driving through a belt 98 to a gear pulley 100 on a longitudinally extending shaft 102 arranged along the other side of the base 44 from the shaft 64. The shaft 102 contains similar pulleys such as a gear pulley 104 driving through a gear belt 106 to a gear pulley 108 to drive an associated shaft 110 of each of the devices 38 or 22 which are contained on the support assemblies 30 as described previously in respect to the other side of the machine.

The conveyor 16 is of the unique construction in accordance with the invention and it includes an endless conveyor chain generally designated 112 which is trained to run around a drive sprocket 94 and a counter sprocket 114 arranged at the opposite end of the machine.

Figure 3:
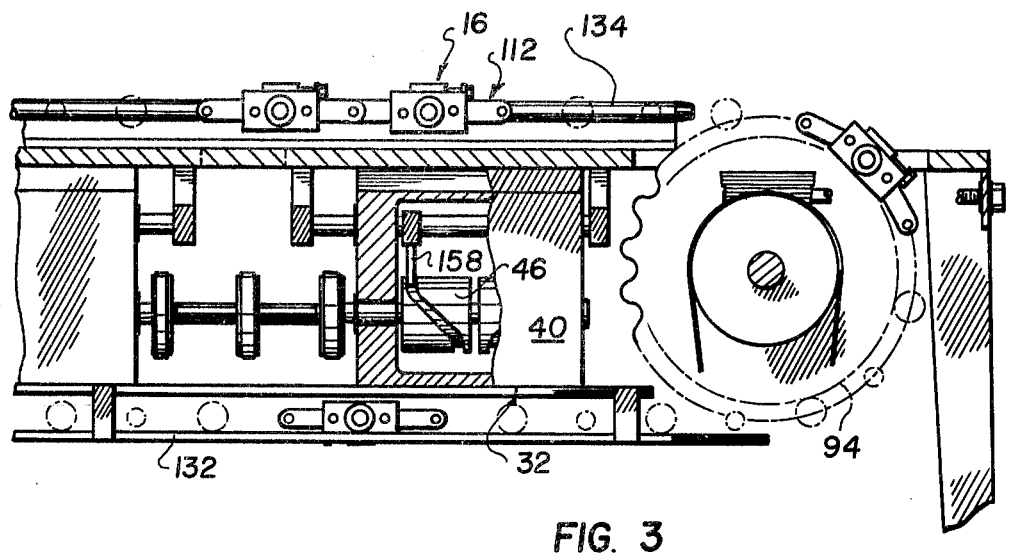
FIG. 3 is a partial side elevational view partly in section of the conveyor shown in FIG. 1.
Figure 4:
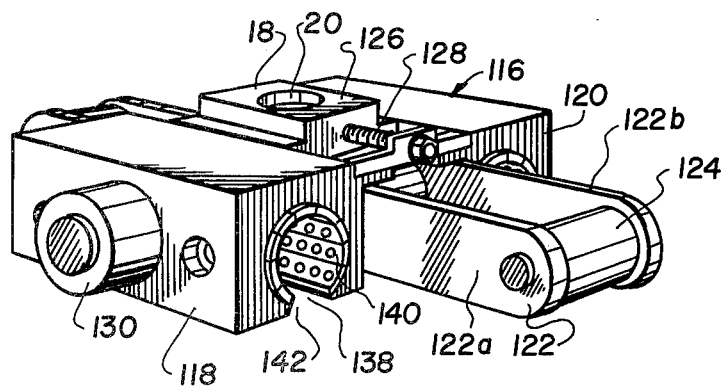
FIG. 4 is an enlarged front end perspective view of a conveyor chain link.

As best seen in FIGS. 3 and 4 the conveyor 16 includes the conveyor chain 112 which is made up of individual links generally designated 116 which comprise the block-shaped support 18. In the embodiment illustrated the support 18 is block shaped and includes block-shaped parts 118 and 120 on respective sides of a double armed link part 122. The link part 122 includes arms 122a and 122b forming a journal for a link pin 124. Each link 116 is articulated at the link pin 124 to the next adjacent link. The conveyor link 116 in the embodiment shown includes a raised central portion 126 which defines the support 18 and includes the receiving recess 20. The raised portion 126 is adjustable in the longitudinal direction by adjusting a threaded carrier bolt 128. The conveyor link also carries rollers 130 on respective sides which form guides rollers which roll on track guides 132 which are disposed on respective sides of the conveyor links at the lower reach thereof and they provide a support for its travel along the complete horizontal path of the lower reach or section.

In accordance with a feature of the invention the upper section of the conveyor is guided on two spaced apart guide rails or tubular guiding elements 134 and 136 to facilitate this guidance block-shaped parts 118 and 120 are provided with longitudinal bores 138 which are lined by linear recirculating roller bearings 140. The bores have a downward opening 142 to accommodate the support structure of the guide rails 134 and 136 but the upper cylindrical part of the guide rails extends through the linear roller bearings 140 and provides a support for the free rolling frictionless support of the individual conveyor lengths 116. Directly adjacent each end of the guide rails the table 34 is provided with a slot or opening 144 at each end to accommodate the respective sprockets 94 and 114. As a feature of the construction the shafts 92 and 92' which support the respective sprockets 94 and 114 of the conveyor are mounted in pillow blocks 146 which are mounted against the bottom face of the top plate 34 so that they may be slid in a longitudinal direction. The threaded member 148 when rotated provides means for adjusting the longitudinal position of the pillow blocks 146 and hence the tension on the conveyor chain 112. In this manner the conveyor chain can always be kept at a selected tension to insure proper operation of all of the block members and proper entrance of the guide rails 134 and 136 into the linear bearing bushings for precision movement and easy frictional advance. The screw 148 may be adjusted by adjusting a nut 150 affixed to a short end wall 152 of the machine base 36.

With the conveyor system and the article handling systems described it can be seen that the articles may be moved precisely in timed relationship to the movement of the supports on each of the conveyor links 116 and precisely positioned on these links as the conveyor continuously moves. The device 38 is similar to the device 22 but it includes an article transporting mechanism 14' having an article pickup head 28' which moves backwardly and forwardly and upwardly and downwardly and does not rotate through an arc such as indicated by the arrow 154 in respect to the article handling device 14. In the cases of all of the devices which are carried on each of the four separate support assemblies 30 which are provided there is a predetermined timed operation about the timing of the picking up of the article as well as its movement and also in the timing of the movement of the article in the direction of the conveyor in timed relationship to it. Advantageously, the rate at which the elements or articles 12 are moved is chosen to equal the movement of the conveyor 16 so that there is no relative movement between the article being transported and the conveyor at the time it is deposited thereon or lifted off the conveyor.

Figure 2:
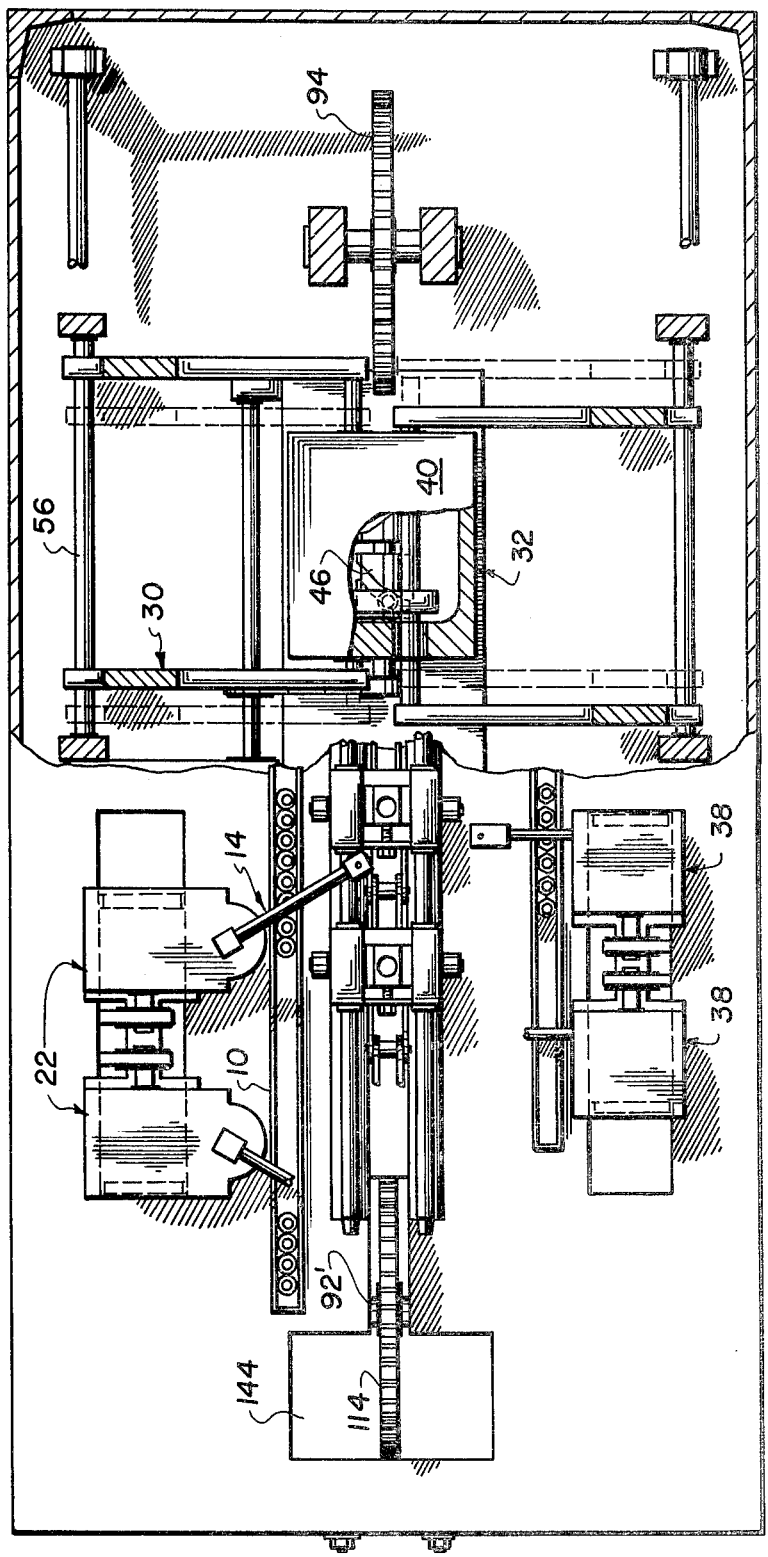
FIG. 2 is a partial top plan view and partial horizontal sectional view of the device shown in FIG. 1.

The development of the cam 46 is shown in FIG. 8. There are two cam surfaces shown for separately controlling shafts 48 and 50 and these are designated 254 and 256. The shape of these cam surfaces 254 and 256 is chosen for the time requirements of the particular article placement device to be serviced by that cam. The motion generated for example by cam surface 254 is as follows: In the section designated D-A cam follower or rod member 158 as shown in FIG. 3 is motionless as the drum turns and allows the article placement device time to pick up an article at a loading station such as the loading station 10 shown in FIGS. 1 and 2. During the section A-B the follower has begun to move taking the article placement device across the table top 34. In Section B-C the follower is moving the device across the table at the same rate as the conveyor chain. During this period placement device 14 or 14' has time to accurately unload the article onto the block element 18.

In the section C-D of the cam curve of FIG. 8 the follower and the placement device return to the load station for a new article. The curve selection is effected to provide for a smooth pickup and lay down of the article as well as to provide for rapid movement of the article during a time at which it returns to an operating station or it is not necessary to have it perform any particular operation.

FIGS. 5, 6 and 7 disclose two separate embodiments of a pickup head which is employed with the handling device 14 for picking up and laying down articles. The boom 26 comprises a tubular member haing an interior compressed air conduit 160 having a bore 162 for the compressed air which communicates with a bore 164 of the pickup member generally designated 128. The pickup member 28 includes an upper tubular part 166 and a lower sleeve part 168 which is slidable over the upper part and is maintained in sealing engagement therewith by suitable seals 170, 172. The seal 172 is located at a vent opening defined through the upper part 166 which upon occasion of an overload communicates with a slot discharge opening 176 which provides means for the escape of pressure from an interior chamber within the sleeve 168, whenever for any reason there is a stoppage of the descent of the outer part 168 such as by an interfering article or a machine part, etc. When the pressure is acting in the chamber 178 it forces a piston 180 in a downward direction to engage upper arm portions 182a of pivotal gripper levers 182 which are pivotally mounted on pivots 184 in widened flange portions 168a of sleeves 168. In the construction indicated the levers 182 include lower arm portions 182b defining article engaging fingers 186 which in the present example are shown engaging an article 12 which comprises a nut. The lower portions 182b are held in an inward biased direction by a compression spring 188 which is connected therebetween so that they remain in the closed position indicated in which they were to grasp and hold the article. When the pressure is applied to the piston 180 the grippers are moved down to the dotted line position shown at which time they release the article 12. If during the downward movement of the sleeve 168 by the pressure present in the space 178 there is a contact with another article or a machine part that would prevent further downward movement and the slot 176 would move upwardly to communicate with the vent opening 174 and vent the space 178 so that no further down movement would be effected.

Precise positioning of conveyor heads with respect to transmitter tooling can be accomplished by means of precise adjusting screw on both transmitter and conveyor heads, independent of conveyor chain spacing even after considerable time when chain links or pins have worn (FIG. 4, see 128 and adjusting screws on transmitter).

In the embodiment of the head designated 28' in FIGS. 6 and 7 the lower sleeve member comprises the member 168' having a pressure source 178' forcing a piston 180' in a downward direction against the compression spring 186' which tends to restore it to an upward position. In the upward position a gripper lever arm 182' is biased by compression spring 188 between two adjacent arms 182', 182' to a closed position in which they are close together. They are open to an outward position to drop the article and assume the dotted line position indicated in FIG. 7 when the pressure in space 178' is increased to a point at which the piston 180' forces a lower tip end 190 to slide against bevelled surfaces 192 of the lever arm 182' to move them outwardly against the force of the spring 188. The closing and opening end positions may be adjusted by a threaded member 194 which is threaded through each arm portion 182' and abuts against a central cylindrical portion 196 formed in an extension of the housing sleeve 168'.

Because of extended portions 256 and 254 of the curves shown in FIG. 8, operation of pick-up and placement heads 28 and 28' can be timed to operate at various times different from each other and thus eliminate or minimize the vibration and imbalance that would cause the entire machine to shake if they all operated at the same time. This is the case in an indexing machine where all heads operate with the conveyor in a stopped position.

The two pickup heads shown, namely the pickup head 28 and the pickup head 28' provide means wherein the article will be released by the application of a control pressure as in the case of the embodiment of FIG. 5 and FIGS. 6 and 7. In some cases it is very desirable that the article will be automatically held by the spring force without any control pressure during its transportation and in such case the embodiments of FIGS. 6 and 7 would be appropriate. The invention provides a basic construction for many possible alternate arrangements of the basic structures and devices for feeding, loading and interconnecting articles onto a conveyor part which is moving and with a minimum of interference and with the possibility of a maximum amount of speed of operation and with a mechanism which will have a very long life due to its balancing and simple structural arrangement. A very important feature of the arrangement is that all of the parts may use interchangeable devices for establishing an overall assembly or disassembly program on a moving conveyor. The individual timing cams in each of the article handling devices such as the devices 22 and 38 can give an infinitely wide variation of timing and speed controls to the picking up, moving and placing of the articles. In addition a further variety of speed operation is achieved by precise cam control of the longitudinal displacement of the supporting slide 30 carrying the article handling devices.

A further feature of the invention resides in the particular construction of the conveyor wherein the conveyor block elements which are guided on the rod elements in their upper reaches provide a smooth operating and efficient means for moving machine parts through precise controlled paths in a manner such that they are always moved in easy rolling frictional movement. In addition the conveyor will have a long life because the lower reach is guided so there will not be any major distortion of the linkage elements and any tension variations of the conveyor may be easily taken up by the longitudinal adjustments of the pillow blocks which support the bearings for the shafts of the sprockets.

While specific embodiments of the invention have been shown and described in detail to illustrate the application of the principles of the invention, it will be understood that the invention may be embodied otherwise without departing from such principles.

What is claimed is:

1. A device for use with a moving conveyor for placing and removing articles therefrom, comprising an article transmitter support, a reciprocator device having a rotatable shaft being adapted to be connected to the conveyor for rotation in timed relationship thereto, at least one rod member in said reciprocator device movable backwardly and forwardly in longitudinal directions, cam means connected to said shaft for rotation thereby and acting on said rod member to move it backwardly and forwardly, said rod member being connected to said reciprocator device to move it backwardly and forwardly in timed relationship to said conveyor, and means on said reciprocator device to pick up and deposit articles.

2. A device according to claim 1, wherein said reciprocator device includes a cam, said rod member having a follower engaged with said cam, a slide assembly having a support table comprising said transmitter support, a transmitter on said support including a rotatable transmitter cam, an article handling device movable by said transmitter cam backwardly and forwardly and upwardly and downwardly to pick up an article and to move it from a stationary position through the moving conveyor, and a common drive connected to said transmitter cam and to said reciprocator device cam and to said conveyor to operate the cam in timed relationship.

3. A device according to claim 1, wherein said drive means includes a drive motor having a drive transmission with a first drive shaft, gear belt means connected between said first drive shaft and said transmitter cam shaft, second gear belt means connected between said first drive shaft and said reciprocator device cam shaft, and third gear belt drive means connected between said drive shaft and said conveyor.

4. A device according to claim 3, wherein said conveyor includes a first and second spaced sprockets, an endless link chain connected to said sprockets and having a top support surface for articles, means defining a fixed article stand, said article transmitter mounted on said support being movable adjacent said article stand to pick up articles therefrom and deposit them on said conveyor support.

5. A device for picking up and placing articles on a moving conveyor or assembly line, comprising conveyor means including a support adapted to be moved in a first conveyor path, an article station adjacent said conveyor means, an article handling device support assembly adjacent said conveyor, means mounting said article handling device support assembly for movement along an article handling path, a drive motor having a rotatable motor shaft connected to said conveyor means to move said conveyor means, a reciprocator having an input shaft connected to said motor shaft, article support control cam means in said reciprocator connected to said input shaft and a slide member carrying said article handling device support assembly engaged with said article support control cam means and being movable thereby to move the article handling support assembly in timed relationship to said conveyor means, said article handling device support assembly including an article pick-up member having article gripping means, housing means mounting said article pick-up member for rotatable and upward and downward movement, pick-up member control cam means rotatably mounted in said housing means and operatively engaged with said article pick-up member for moving it in a predetermined rotatable and upward and downward movement for picking up and depositing articles and moving them through an article movement path intercepting said conveyor means support and said article station, said drive motor moving said article handling support assembly in timed relationship to the movement of said conveyor means whereby articles may be placed on and alternatively, removed from, said article handling support and wherein the articles are moved at selected speeds in respect to said conveyor means.

6. A device according to claim 5, wherein said pick-up member control cam means includes a rotatable cam, a follower connected to said article engaging member for moving said article engaging member in timed relationship to rotation of said cam, said cam having a cam shaft with a gear pulley thereon, and a gear belt drive between said motor shaft and said gear pulley to drive said article holding member in timed relationship.

7. A device according to claim 5, wherein said article handling device support assembly includes, a boom mounted in said housing means for up and down movement and for pivotal back and forth movement, said article pickup member being carried by said boom.

8. A method of accurately placing and alternatively, for removing, an article from a selected position on a moving conveyor using an article handling device having a pick-up member mounted on a movable support, and a drive motor having a rotatable shaft connected to the conveyor to move it, and a reciprocator connected to the shaft and movable support for shifting the support relative to the conveyor, comprising starting the motor to move the conveyor and moving the movable support with the pick-up member while simultaneously shifting the pick-up member to position it in alignment with an article, thereafter picking up the article at an article station, moving the pick-up member with the article while advancing the support so as to bring it substantially to the speed of the conveyor while moving the pick-up member to a position to drop the article on the conveyor, the pick-up member being capable of alternatively removing an article from the conveyor after the support is first brought up to the speed of the conveyor and thereafter shifting the support relative to the conveyor to bring the support alongside an article receiving station and moving the pick-up member into alignment with the receiving station to deposit the article thereon.

* * * * *